(12) United States Patent
Keller (10) Patent No.: US 7,992,623 B2
(45) Date of Patent: Aug. 9, 2011

(54) RADIANT HEAT WALL COVERING SYSTEM

(75) Inventor: James P. Keller, Gloversville, NY (US)

(73) Assignee: Keller Komfort Radiant Systems, Inc., Fonda, NY (US)

( * ) Notice: Subject to any disclaimer, the term of this patent is extended or adjusted under 35 U.S.C. 154(b) by 1037 days.

(21) Appl. No.: 11/621,862

(22) Filed: Jan. 10, 2007

(65) Prior Publication Data

US 2008/0164005 A1 Jul. 10, 2008

(51) Int. Cl.
*F24D 5/10* (2006.01)
*F24D 19/02* (2006.01)
*F24D 19/04* (2006.01)
*F24H 9/06* (2006.01)

(52) U.S. Cl. ............... 165/53; 165/49; 165/55; 237/69; 392/352

(58) Field of Classification Search ............ 165/47, 165/49, 53, 55; 392/352; 237/69; 126/658, 126/659, 660, 661, 662
See application file for complete search history.

(56) References Cited

U.S. PATENT DOCUMENTS

| | | | |
|---|---|---|---|
| 1,913,342 A | 6/1933 | Schaffert | |
| 2,102,231 A | 12/1937 | Zoettl | |
| 2,799,481 A | 7/1957 | Becker | 257/124 |
| 2,919,117 A * | 12/1959 | Hoffman | 237/69 |
| 2,944,138 A * | 7/1960 | Goff | 165/55 |
| 3,037,746 A | 6/1962 | Williams | 257/124 |
| 3,319,708 A * | 5/1967 | Nelson | 165/55 |
| 3,636,412 A | 1/1972 | Simovits et al. | |
| 4,064,866 A * | 12/1977 | Knight, Jr. | 165/49 |
| 4,080,703 A | 3/1978 | Beck, Jr. | 29/157.3 C |
| 4,086,913 A * | 5/1978 | Gavin | 126/659 |
| 4,097,720 A * | 6/1978 | Sand | 165/53 |
| 4,160,575 A * | 7/1979 | Schraut | 439/460 |
| 4,164,932 A * | 8/1979 | Gavin | 126/659 |
| 4,170,221 A * | 10/1979 | Gavin | 126/659 |
| 4,241,727 A * | 12/1980 | Toti | 126/659 |
| 4,246,892 A * | 1/1981 | Waiche | 126/662 |
| 4,369,836 A | 1/1983 | Bleckmann | 165/171 |
| 4,424,656 A | 1/1984 | LaVanture | 52/584 |

(Continued)

FOREIGN PATENT DOCUMENTS

DE 3932972 4/1991

(Continued)

OTHER PUBLICATIONS

Non-final Office Action issued in U.S. Appl. No. 11/550,977 with a Mail Date of Dec. 13, 2010 (19 pages).

*Primary Examiner* — Ljiljana (Lil) V Ciric
(74) *Attorney, Agent, or Firm* — Heslin Rothenberg Farley & Mesiti P.C.; Victor A. Cardona, Esq.

(57) ABSTRACT

A wall covering system for radiant heating includes a first wall covering portion and a second wall covering portion. The first portion is releasably connectable to the second portion in a direction substantially perpendicular to an outer surface of the first portion. The first portion includes a bottom side and top channel portion downwardly depending from the bottom side. The second portion includes a top side and a bottom channel portion extending upwardly from the top side. The top channel portion and the bottom channel portion bound a channel for receiving a heating conduit. The channel extends longitudinally relative to the first portion and the second portion.

21 Claims, 8 Drawing Sheets

U.S. PATENT DOCUMENTS

| | | | | |
|---|---|---|---|---|
| 4,491,175 A * | 1/1985 | Bloem | | 126/658 |
| 4,635,710 A | 1/1987 | Shelley | | 165/49 |
| 4,759,402 A | 7/1988 | Osojnak | | 165/56 |
| 4,764,675 A | 8/1988 | Levy et al. | | |
| 5,454,428 A | 10/1995 | Pickard et al. | | 165/49 |
| 5,459,810 A * | 10/1995 | Villa | | 165/55 |
| 5,597,033 A | 1/1997 | Cali | | 165/55 |
| 5,743,327 A * | 4/1998 | Villa | | 165/55 |
| 5,743,330 A | 4/1998 | Bilotta et al. | | 165/183 |
| 5,788,152 A | 8/1998 | Alsberg | | 237/69 |
| 5,799,723 A | 9/1998 | Sokolean | | 165/49 |
| 5,862,854 A | 1/1999 | Gary | | 165/55 |
| 5,930,962 A | 8/1999 | Sokolean | | 52/220.1 |
| 6,073,407 A | 6/2000 | Sokolean | | 52/302.1 |
| 6,092,587 A | 7/2000 | Ingram | | 165/56 |
| 6,115,981 A | 9/2000 | Counihan | | |
| 6,199,340 B1 | 3/2001 | Davis | | |
| 6,283,382 B1 | 9/2001 | Fitzemeyer | | 237/69 |
| 6,330,980 B1 | 12/2001 | Fiedrich | | 237/69 |
| 6,526,704 B1 | 3/2003 | Berard et al. | | 52/177 |
| 6,726,115 B1 | 4/2004 | Chiles et al. | | 237/69 |
| 6,903,265 B1 | 6/2005 | VanderVelde et al. | | |
| 6,910,526 B1 | 6/2005 | Sokolean | | 165/56 |
| 7,748,176 B2 | 7/2010 | Harding et al. | | |
| 2004/0031590 A1 | 2/2004 | Vilia | | 165/81 |
| 2006/0070319 A1 | 4/2006 | Flynn | | |
| 2007/0017656 A1 | 1/2007 | Da Rold | | |
| 2010/0155133 A1 | 6/2010 | Makwinski et al. | | |

FOREIGN PATENT DOCUMENTS

| | | |
|---|---|---|
| EP | 17846 | 10/1980 |
| EP | 133556 | 2/1985 |
| JP | 56030589 | 3/1981 |
| JP | 56030590 | 3/1981 |
| JP | 62005026 | 1/1987 |
| JP | 52009954 | 1/1997 |
| WO | 2004072406 | 8/2004 |

* cited by examiner

RADIANT HEAT WALL COVERING SYSTEM

FIELD OF THE INVENTION

The present invention relates to wall covering systems and in particular systems and methods for radiant heat wall covering systems.

BACKGROUND OF THE INVENTION

Radiant heating systems for wall coverings heat the walls of a dwelling, office, or other building, which then heat the habitable space thereof. Tile, hardwood floors or other aesthetically desirable materials are typically used for wall covering in combination with radiant heating systems. The radiant heating conduits are usually located on an opposite side of the wall covering relative to a surface visible from a room interior. The conduits are thus usually installed and maintained in an area (e.g., behind a wall) which is not directly accessible to the inhabited space portion of a room. Often, insulation is desirable to inhibit heat from the heated space from transferring toward an unheated space or the ambient environment. Insulation and a wall itself are thus usually placed over such heating conduits and must be removed in the event that maintenance or other access is desired relative to the heating conduits. In a typical radiant heating system, the conduits are attached via brackets to the hidden side of wall coverings such that they are not easily removed therefrom in the event that maintenance or replacement is desired.

Thus, a need exists for radiant wall heating systems which are aesthetically attractive, easily maintainable, and energy efficient.

SUMMARY OF THE INVENTION

The present invention provides, in a first aspect, a wall covering system for radiant heating which includes a first wall covering portion and a second wall covering portion. The first portion is releasably connectable to the second portion in a direction substantially perpendicular to an outer surface of the first portion. The first portion includes a bottom side and a top channel portion downwardly depending from the bottom side. The second portion includes a top side and a bottom channel portion extending upwardly from the bottom side. The top channel portion and the said bottom channel portion bound a channel for receiving a heating conduit, and the channel extends longitudinally relative to the first portion and the second portion.

The present invention provides, in a second aspect, a wall covering system which includes a first wall covering portion having a top side with decorative finish directly applied thereto, and a second wall covering portion. The first portion is releasably connectable to the second portion in a direction substantially perpendicular to an outer surface of the first portion. The first portion is releasable from the second portion such that removal of the decorative finish from the first portion is avoided.

The present invention provides, in a third aspect, a wall covering system for radiant heating which includes a first wall covering portion and a second wall covering portion. The first portion includes a bottom side and a top channel portion downwardly depending from the bottom side. The second portion includes a top side and a bottom channel portion extending upwardly from the bottom side. The top channel portion and the bottom channel portion bound a channel for receiving a heating conduit. The top channel portion includes a bottommost side closest to the bottom channel portion and the bottom channel portion includes an uppermost side closest to the top channel portion. The bottommost side and the uppermost side bound a space configured to allow the top channel portion and the bottom channel portion to move relative to each other into the space.

The present invention provides, in a fourth aspect, a wall covering system for radiant heating which includes a first wall covering portion and a second wall covering portion. The first portion includes a second side and the second portion includes a top side. A receiving cavity between the first portion and the second portion is configured to receive a heating conduit. The second portion includes a lower side having an insulation slot.

DETAILED DESCRIPTION OF THE INVENTION

In accordance with the principals of the present invention, a radiant wall covering system and methods for radiant wall heating are provided.

Figure 1:
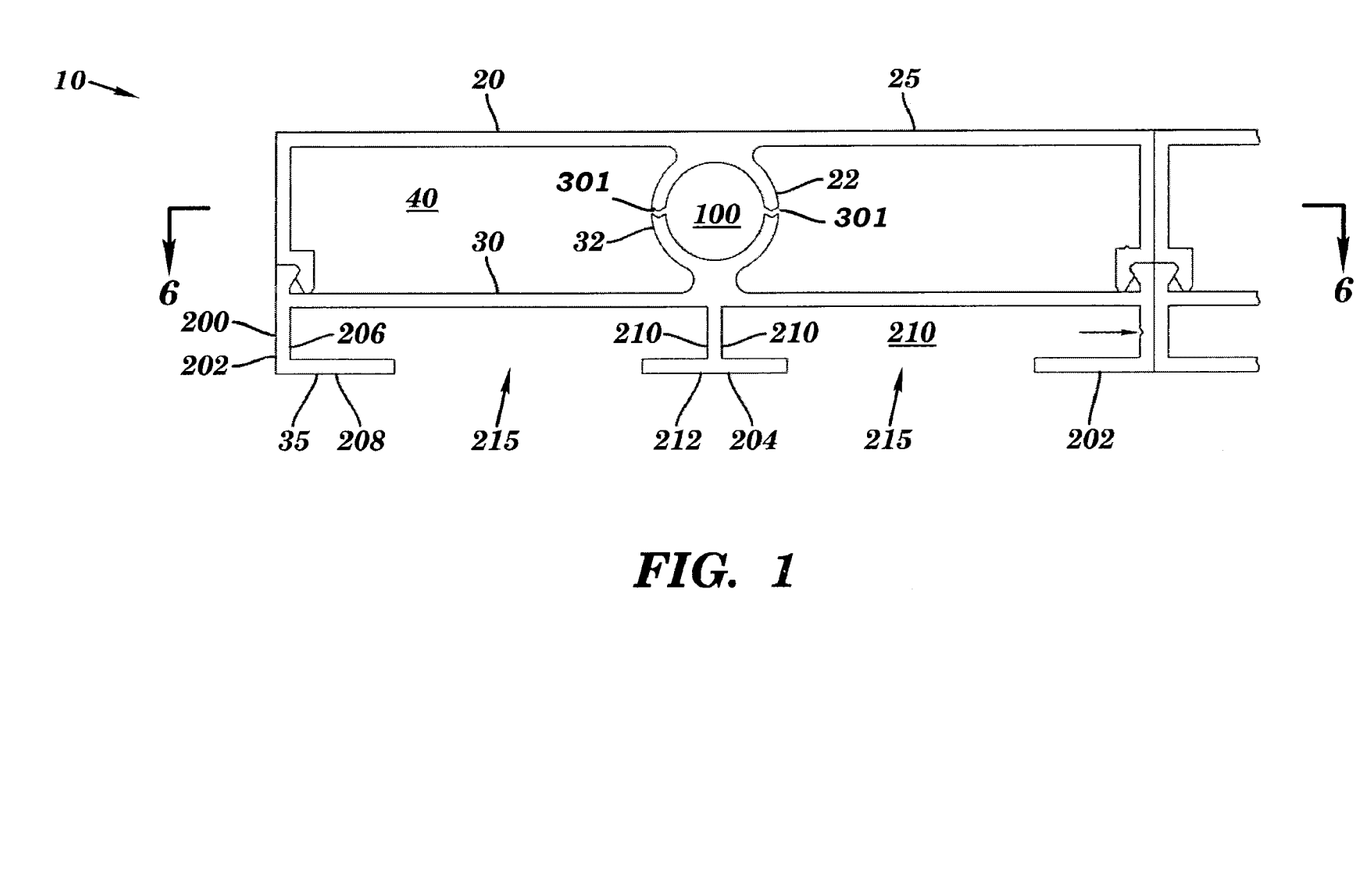
FIG. 1 is a side elevational view of a radiant heat wall covering system in accordance with the present invention.

In an exemplary embodiment depicted in FIG. 1, a wall covering system 10 includes a first or outer wall covering portion 20 and a second or interior wall covering portion 30 for supporting the first portion. A top surface 25 of first portion 20 is utilized in a manner similar to a top surface of typical wall covering, e.g., located adjacent habitable space and having an aesthetically pleasing surface such as paint, texture, or wall paper thereon. A bottom surface 35 of second portion 30 is utilized in a manner similar to a typical support material, e.g., connected to wall studs such as wall studs 300 (FIGS. 6-7), concrete walls or other such wall covering support to support a wall covering placed thereon and/or attached thereto. Multiple instances of system 10 may be located adjacent one another to form a wall covering on such wall covering support as depicted for example in FIGS. 6-7.

Figure 2:
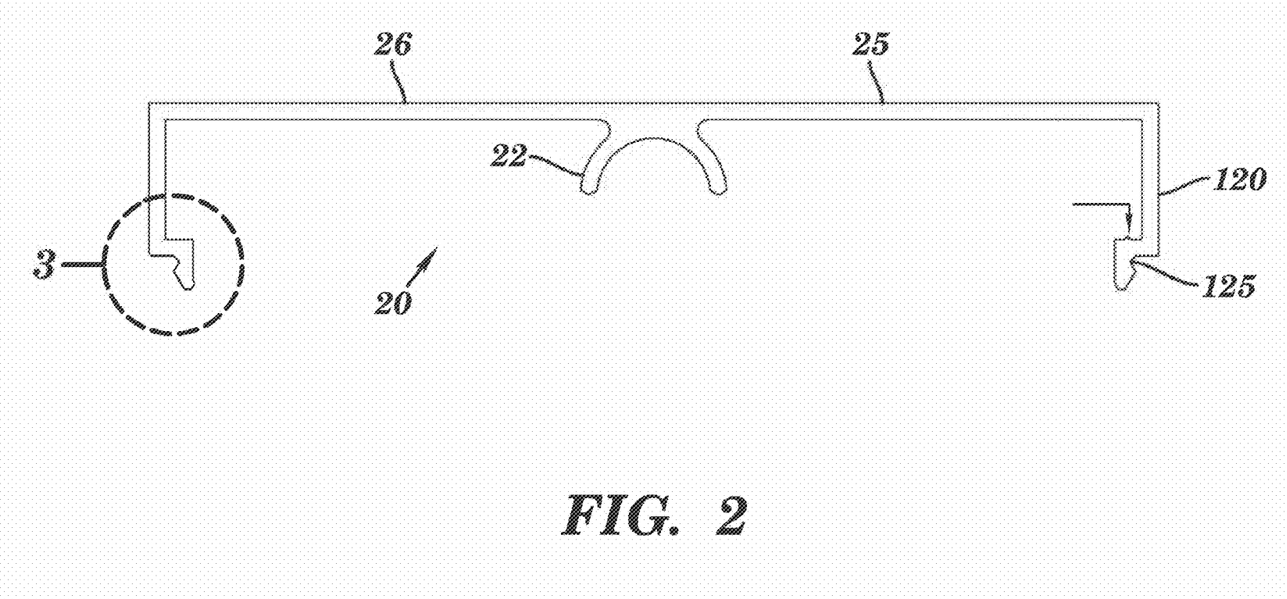
FIG. 2 is a side elevational view of a first wall covering portion of the wall covering system of FIG. 1.
Figure 3:
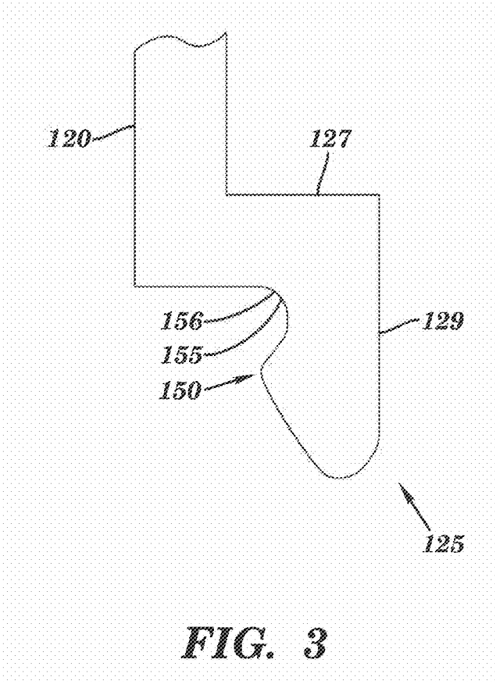
FIG. 3 is a side elevational view of a connecting portion of the first portion of FIG. 2.
Figure 4:
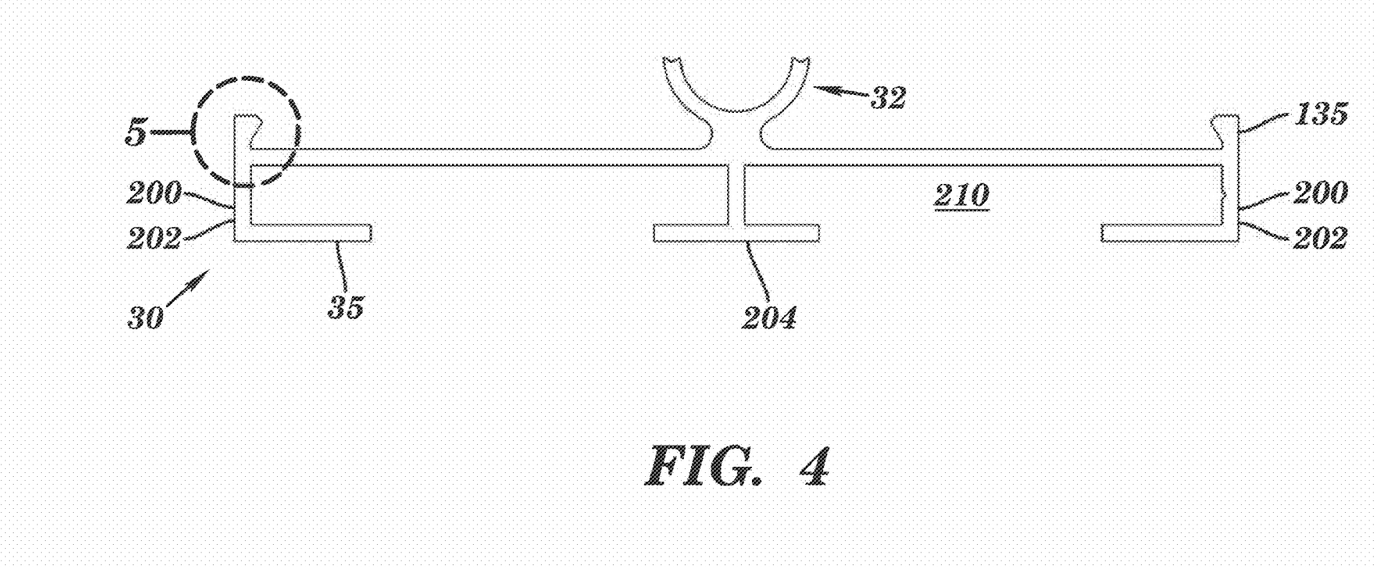
FIG. 4 is a side elevational view of a second wall covering portion of the wall covering system of FIG. 1.
Figure 5:
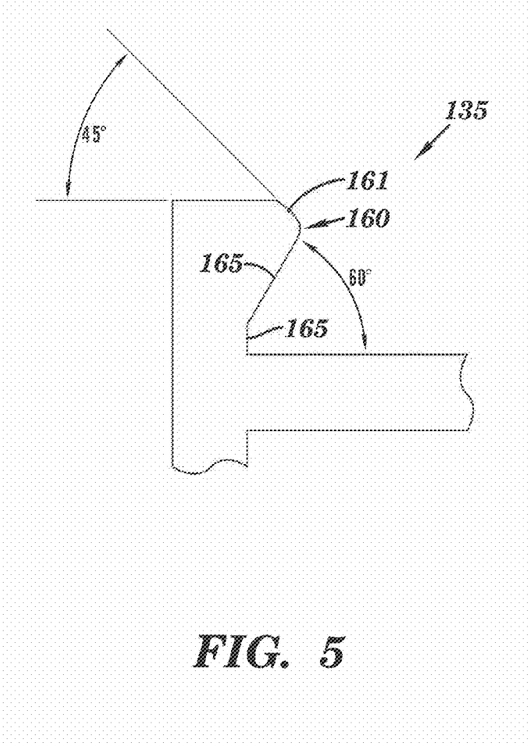
FIG. 5 is a side elevational view of a connecting portion of the second portion of FIG. 4.

First portion 20 is releasably connected to second portion 30 to allow access to a cavity 40 therebetween. As depicted in FIGS. 2-4, first portion 20 and second portion 30 include engaging or connecting portions to allow such releasable connection. As best depicted in FIGS. 2-3 first portion 20 includes side portions 120 bounding cavity 40 and having downwardly depending connecting portions 125 for engagement with upwardly extending connecting portions 135 (FIGS. 4-5) of second portion 30. Each of connecting portions 125 includes a horizontal portion 127 and a vertical portion 129 having a horizontally protruding portion 150. A groove 155 is present above horizontally protruding portion 150 and is configured (e.g., shaped and dimensioned) to receive a horizontally protruding portion 160 (FIG. 5) of one of upwardly extending connecting portions 135 (FIGS. 4-5). As best depicted in FIGS. 1, 3 and 5, the connecting portions (e.g. connecting portions 125 and 135) have complementary shapes to allow them to engage with each other to releasably connect first portion 20 to second portion 30.

Figure 6:
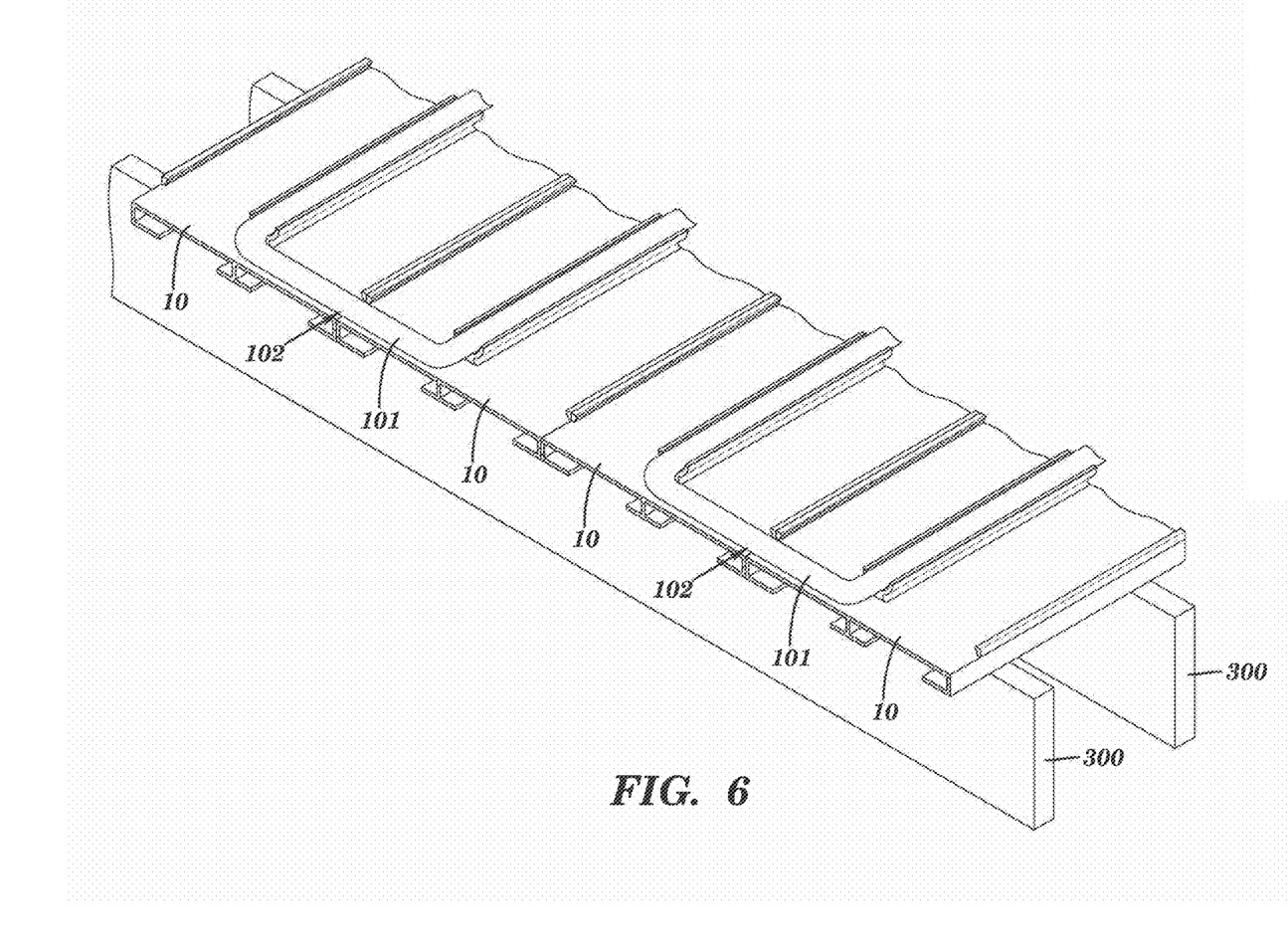
FIG. 6 is a top cross sectional view of several radiant wall covering heating systems adjacent one another taken along lines 6-6 of FIG. 1.
Figure 7:
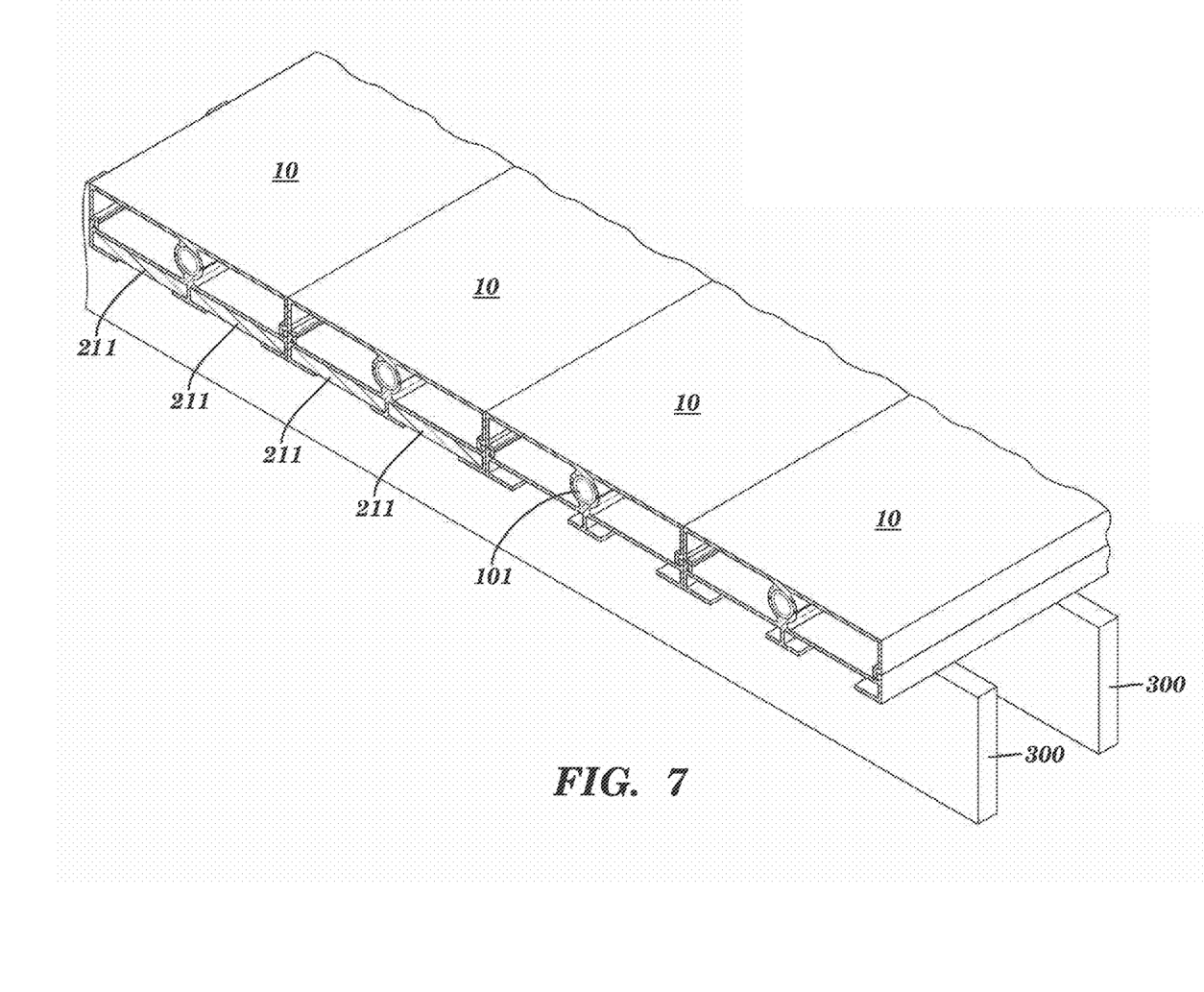
FIG. 7 is a perspective view of multiple radiant heat wall covering systems installed adjacent one another on multiple studs of a wall.

Wall covering system 10 may also include a channel 100 for receiving a radiant heating conduit 101 in cavity 40 as depicted in FIGS. 1 and 6, for example. The conduit could be a flexible plastic conduit, copper pipe, or any other pipe or conduit configured to be used for radiant heating systems. First portion 20 may include a downwardly depending top channel portion 22 and second portion 30 may include an upwardly extending bottom channel portion 32 which together bound and define channel 100. When assembled as depicted in FIG. 1, a space 300 may be present between the channel portions (i.e., top channel portion 22 and bottom channel portion 32) on one or both longitudinal sides of channel 100. The space may define the channel portions as arcuate portions having equal arcuate dimensions. Such space may allow a flexing of first wall covering portion 20 toward second portion 30 in response to pressure being placed on first portion 20. Also, the space (e.g., space 300) between the channel portions may facilitate heat transfer via the moving of air from the channel (e.g., channel 100) through the space to the remainder of the cavity (e.g., cavity 40) between first wall covering portion 20 and second portion 30. The spaces may be longitudinally intermittent or continuous along the longitudinal sides of channel 100.

As described above, the connecting portions (e.g., connecting portions 125 and 135, FIGS. 3 and 5) have complementary shapes to allow them to engage with each other. For example, horizontally extending portion 160 may have an outer surface 161 which is angled such that it is parallel to an inner surface 156 of groove 155. Further, each connecting portion is elastically deformable (e.g., portion 125 may rotate inwardly toward channel 100 and portion 160 may rotate outwardly away from channel 100) to allow the horizontally protruding portions to move past each other such that for each pair of connecting portions, horizontally extending portion 160 may be received in groove 155 and horizontally extending portion 150 may abut an engaging surface 165 of one of upwardly extending connecting portions 135. This movement may cause first portion 20 and second portion 30 to 'snap' together and therefore to inhibit separation to a degree not exceeding that which a typical person could exert to free first portion 20 from second portion 30. For example, first portion 20 may be detachable from second portion 30 in a direction substantially perpendicular to top surface 25 and/or bottom surface 35. Such releasability may facilitate any maintenance or investigation relative to a conduit 101 which may be located in channel 100 and/or cavity 40.

Second wall covering portion 30 includes legs 200 which may depend downwardly and extend horizontally to at least partially bound an insulation slot or cavity 210 as depicted in FIGS. 1 and 4. For example, each second or interior portion may include side legs 202 and a central leg 204. Legs 202 may include vertical portions 206 and horizontal portions 208. Central leg 204 may include vertical portion 210 and horizontal portion 212. Each of the cavities 210 between the side legs and the center leg may hold insulation 211 (FIG. 7) therein which may be of any type (e.g., fiberglass, polystyrene foam) which inhibits heat transfer from top surface 25 toward bottom surface 35 or vice versa. Such insulation may make wall coverings or walls made of multiple adjacent panels or portions of systems 10 more comfortable to a person located on a side of system 10 closest to top surface 25 by inhibiting heat transfer to or from a side of the wall covering opposite the insulation. Also, openings 215 may allow the insulation to be inserted into, and removed from, cavities 210.

In one example, top surface 25 may include a finish 26 applied directly thereto. This finish may be decorative and could include an image to make top surface 25 appear to be wood (e.g., wainscoting), ceramic tile, wall paper, dry wall, or another desired wall covering material. The finish may be formed from a plastic film or other coating directly applied to top surface 25, which may be heated and/or otherwise treated to inhibit removal of such finish from the top surface. Further, the finish may include wood, leather, or laminate materials which may be bonded directly to top surface 25 such that the finish is non-separable relative to top surface 25.

Figure 8:
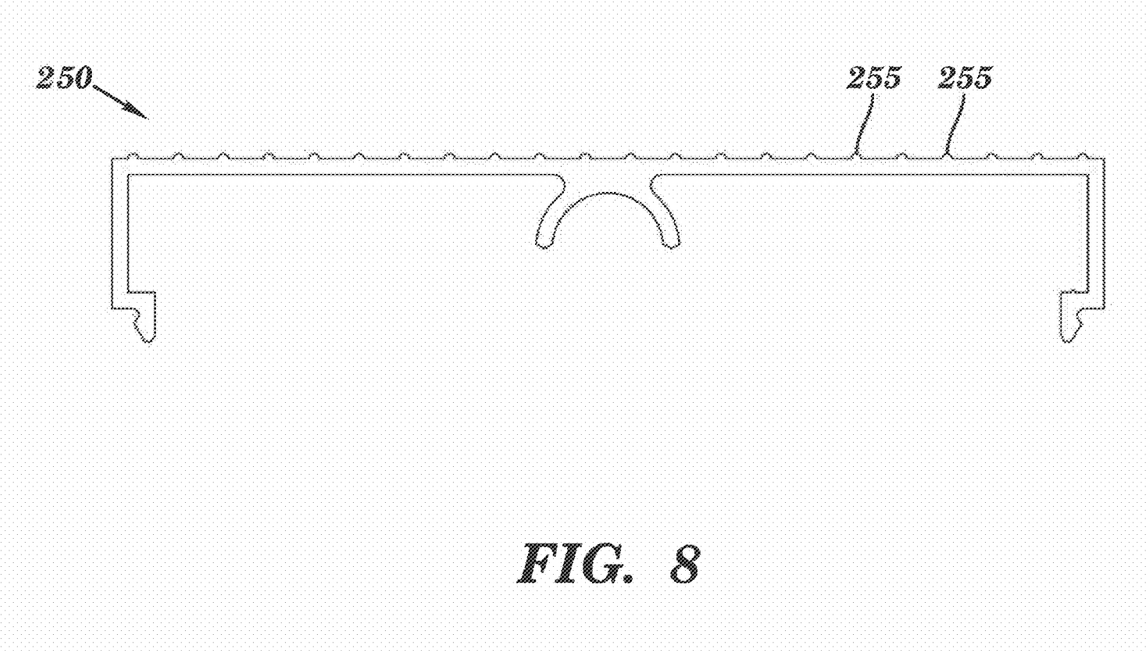
FIG. 8 is a side elevational view of another embodiment of a first wall covering portion in accordance with the present invention, which includes projections on the outer surface of the first wall covering portion.

Such finish could also include a textured surface 250 having a three-dimensional surface such as vertical projections 255 as depicted in FIG. 8. For example, such projections could provide a desirable aesthetic appearance. The projections may also promote heat transfer due to the increased surface area provided by the sides (e.g., longitudinal) of the projections. Any number of additional textures or images may also be included in the top surface to enhance the visual and/or function appeal thereof.

As will be evident to one skilled in the art, finish 26 is applied to top surface 25 of first portion 20, which may be releasably connectable to second portion 30. For example, first portion 20 may be releasable from second portion 30 after second portion 30 is attached to wall studs, concrete or another means for support during a wall installation and that finish 26 is also releasable along with the remainder of first portion 20.

System 10 (e.g., including first portion 20 and second portion 30) may be made of any materials (e.g., powder coated aluminum) which may support its own weight to allow it to be used as a wall and which is elastically deformable to allow the releasable connection of first portion 20 to second portion 30. System 10 (e.g., first portion 20 and second portion 30) may be formed of extruded aluminum, for example.

Also, relative to the channels (e.g., channel 100) which receive heating conduits, portions of upwardly extending portion 32 and/or downwardly depending portion 22 may be absent (e.g., removed) resulting in connecting passages 102 which allow such conduits (e.g., conduits 101) to run between channels (e.g., channel 100) of adjacent wall covering system(s) 10 as depicted for example in FIG. 6. Heat transfer fluid may thus flow between adjacent channels through such connecting passages among multiple wall covering systems 10. Further, each system 10 could include multiple channels (e.g. channel 100) having multiple upwardly extending bottom channel portions 32 and downwardly depending top channel portions 22 within cavity 40. Also, such heating conduits may include a heat transfer fluid (e.g., water) for heating which is at a reduced temperature relative to a typical 160 degrees in typical radiant heating systems. The lower temperature which may be utilized in radiant wall covering systems is possible due to the materials used (e.g., powder coated aluminum) and the insulation which may be found in an insulation slot 200 thereof to inhibit heat transfer from a heated area toward a non-heated one.

System 10 may be utilized as noted for wall coverings for both residential and commercial purposes. It will also be understood by one skilled in the art that system 10 could be utilized for cooling through the use of cool fluids flowing through conduits received in cavity 40. Further, it will be understood to one skilled in the art that system 10 could be used in applications other than walls. For example, system 10 could be utilized on the floors or ceiling of residential and commercial buildings.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A wall covering system for radiant heating comprising:
   a first wall covering portion and a second wall covering portion;
   said first portion releasably connectable to said second portion in a direction substantially perpendicular to an outer surface of said first portion to form a cavity area between said first portion and said second portion, said first portion comprising a bottom side and a top channel portion downwardly depending from said bottom side; and
   said second portion comprising a top side and a bottom channel portion connected to and extending upwardly from said top side, said top channel portion and said bottom channel portion being separable from one another and together forming a channel including a heating conduit, said channel extending longitudinally relative to said first portion and said second portion, said top channel portion and said bottom channel portion together defining a channel area located within but separate from said cavity area.

2. The system of claim 1 wherein said top channel portion comprises a bottommost side closest to said bottom channel portion and said bottom channel portion comprises an uppermost side closest to said top channel portion and further comprising a space between said bottommost side and said uppermost side to allow said top channel portion and said bottom channel portion to move vertically relative to each other into said space.

3. The system of claim 1 wherein said top channel portion and said bottom channel each comprises an arcuate portion, said top channel portion and said bottom channel portion being vertically aligned to form said channel.

4. The system of claim 1 wherein said second portion comprises an underside having an insulation slot.

5. The system of claim 4 wherein said underside comprises a plurality of legs bounding said insulation slot.

6. The system of claim 5 wherein said plurality of legs depend downwardly and substantially perpendicular to said outer surface and extend horizontally and substantially parallel to said outer surface.

7. The system of claim 6 wherein said underside comprises a plurality of openings configured to allow insulation to be inserted into said insulation slot.

8. The system of claim 1 wherein said first portion and said second portion comprise releasable interlocking horizontal portions extending toward each other to allow said first portion and said second portion to releasably connect to each other.

9. The system of claim 8 wherein said horizontal portions comprise barbs configured to releasably interlock to allow said first portion and said second portion to releasably connect to each other.

10. A wall covering system for radiant heating comprising:
    a first wall covering portion and a second wall covering portion said first portion connectable to said second portion to form a cavity area between said first portion and said second portion;
    said first portion comprising a bottom side and a top channel portion downwardly depending from said bottom side;
    said second portion comprising a top side and a bottom channel portion extending upwardly from said top side, said top channel portion and said bottom channel portion bounding a channel area including a heating conduit said channel area located within but separate from said cavity area; and
    wherein said top channel portion comprises a bottommost side closest to said bottom channel portion and said bottom channel portion comprises an uppermost side closest to said top channel portion, said bottommost side and said uppermost side bounding a space configured to allow said top channel portion and said bottom channel portion to move relative to each other into said space.

11. The system of claim 10 wherein said first portion and said second portion comprise releasable interlocking horizontal portions extending toward each other to allow said first portion and said second portion to releasably connect to each other.

12. The system of claim 10 wherein said second portion comprises an underside having an insulation slot.

13. The system of claim 12 wherein said underside comprises a plurality of legs bounding said insulation slot.

14. The system of claim 13 wherein said lower side further comprises a central leg dividing said insulation slot into two insulation slots, said central leg in turn further comprising two central horizontal leg portions extending substantially parallel to said outer surface of said first portion and supporting said insulation.

15. The system of claim 13 wherein said lower side comprises a plurality of openings configured to allow insulation to be inserted into said slot.

16. The system of claim 13 wherein said first portion and said second portion are releasably connectable to each other in a direction substantially perpendicular to an outer surface of said first portion.

17. The system of claim 10 wherein said first portion and said second portion comprise releasable interlocking horizontal portions extending toward each other to allow said first portion and said second portion to releasably connect to each other.

18. A wall covering system for radiant heating comprising:
    a first wall covering portion and a second wall covering portion;
    said first portion comprising a bottom side and said second portion comprising a top side;
    a receiving cavity between said first portion and said second portion, said cavity configured to receive a heating conduit; and
    wherein said second portion comprises a lower side having an insulation slot including insulation, said lower side comprising a plurality of legs bounding said insulation slot.

19. The system of claim 18 wherein said first portion comprises a bottom side and a top channel portion downwardly depending from said bottom side and said second portion comprises a top side and a bottom channel portion extending upwardly from said top side.

20. The system of claim 19 wherein said top channel portion comprises a bottommost side closest to said bottom channel portion and said bottom channel portion comprises an uppermost side closest to said top channel portion and further comprising a space between said bottommost side and said uppermost side to allow said top channel portion and said bottom channel portion to move relative to each other into said space.

21. The system of claim 18 wherein said first portion and said second portion comprise releasable interlocking horizontal portions extending toward each other to allow said first portion and said second portion to releasably connect to each other.

* * * * *